(12) United States Patent
Carlson et al.

(10) Patent No.: US 7,797,414 B2
(45) Date of Patent: Sep. 14, 2010

(54) ESTABLISHING A LOGICAL PATH BETWEEN SERVERS IN A COORDINATED TIMING NETWORK

(75) Inventors: Scott M. Carlson, Tucson, AZ (US); Dennis J. Dahlen, Rhinebeck, NY (US); Richard K. Errickson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 11/876,272

(22) Filed: Oct. 22, 2007

(65) Prior Publication Data

US 2008/0183877 A1 Jul. 31, 2008

Related U.S. Application Data

(60) Provisional application No. 60/887,576, filed on Jan. 31, 2007.

(51) Int. Cl.
*G06F 15/173* (2006.01)
(52) U.S. Cl. .................. 709/223; 709/224; 709/203; 370/395.62
(58) Field of Classification Search .......... 709/223, 709/224, 203, 219; 370/395.62
See application file for complete search history.

(56) References Cited

U.S. PATENT DOCUMENTS

| | | | |
|---|---|---|---|
| 4,894,846 A | 1/1990 | Fine | 375/107 |
| 5,848,028 A | 12/1998 | Burklin | |
| 5,925,107 A | 7/1999 | Bartfai et al. | 709/248 |
| 6,173,023 B1 | 1/2001 | Tanonaka et al. | |
| 6,351,821 B1 | 2/2002 | Voth | |
| 6,535,491 B2 | 3/2003 | Gai et al. | |
| 6,606,362 B1 | 8/2003 | Daizell et al. | |

(Continued)

FOREIGN PATENT DOCUMENTS

WO 01/95550 A2 12/2001

OTHER PUBLICATIONS

PCT/EP2008/050726—Notification of Transmittal of the International Search Report and The Written Opinion of the International Searching Authority, or the Declaration.

(Continued)

*Primary Examiner*—Lashonda T Jacobs
(74) *Attorney, Agent, or Firm*—John E. Campbell; Blanche E. Schiller, Esq.; Heslin Rothenberg Farley & Mesiti P.C.

(57) ABSTRACT

A technique for establishing a logical path between two servers in a coordinated timing network of a processing environment is provided. The technique includes the exchange of command and response message pairs by a server and an attached server, via a physical link. The server transmits a command message to an attached server to establish a server-time-protocol (STP) logical path and receives a response from the attached server. The technique also includes the server receiving a request transmitted by the attached server to establish an STP logical path to the server and transmitting a response to the attached server's request. A logical path between the server and the attached server is established if the attached server's response indicates that the server's request was accepted by the attached server and if the server's response indicates that the attached server's request was accepted by the server.

20 Claims, 8 Drawing Sheets

U.S. PATENT DOCUMENTS

| | | | |
|---|---|---|---|
| 6,697,382 | B1 | 2/2004 | Eatherton ................... 370/503 |
| 6,714,563 | B1 | 3/2004 | Kushi ......................... 370/503 |
| 6,742,044 | B1 | 5/2004 | Aviani et al. ............... 709/235 |
| 6,768,452 | B2 * | 7/2004 | Gilkes .................. 342/357.15 |
| 7,139,346 | B2 * | 11/2006 | Skahan et al. ............... 375/356 |
| 7,356,725 | B2 | 4/2008 | Engler |
| 7,394,802 | B2 * | 7/2008 | Jun et al. .................... 370/350 |
| 7,395,448 | B2 | 7/2008 | Smith |
| 7,454,648 | B2 | 11/2008 | Dahlen |
| 7,475,272 | B2 | 1/2009 | Carlson |
| 7,539,777 | B1 * | 5/2009 | Aitken ........................ 709/248 |
| 2002/0027886 | A1 | 3/2002 | Fischer et al. |
| 2002/0073228 | A1 | 6/2002 | Cognet |
| 2002/0078243 | A1 * | 6/2002 | Rich et al. .................. 709/248 |
| 2002/0131370 | A1 | 9/2002 | Chuah |
| 2003/0035444 | A1 | 2/2003 | Zwack |
| 2003/0152177 | A1 | 8/2003 | Cahill-O'Brien et al. .... 375/354 |
| 2004/0073718 | A1 * | 4/2004 | Johannessen et al. ....... 709/400 |
| 2004/0125822 | A1 * | 7/2004 | Jun et al. .................... 370/503 |
| 2004/0167990 | A1 * | 8/2004 | Peer ........................... 709/248 |
| 2005/0020275 | A1 | 1/2005 | Agrawala et al. |
| 2005/0033862 | A1 | 2/2005 | Blum et al. ................. 709/248 |
| 2007/0086489 | A1 | 4/2007 | Carlson |
| 2007/0086490 | A1 | 4/2007 | Carlson |
| 2008/0059655 | A1 | 3/2008 | Carlson |
| 2008/0059808 | A1 | 3/2008 | Engler |
| 2008/0072097 | A1 | 3/2008 | Check |
| 2008/0183849 | A1 | 7/2008 | Carlson |
| 2008/0183895 | A1 | 7/2008 | Carlson |
| 2008/0183896 | A1 | 7/2008 | Carlson |
| 2008/0183897 | A1 | 7/2008 | Carlson |
| 2008/0183898 | A1 | 7/2008 | Carlson |
| 2008/0183899 | A1 | 7/2008 | Carlson |
| 2008/0184060 | A1 | 7/2008 | Carlson |

OTHER PUBLICATIONS

Kadoch, Michel: "ATM Signalling: A Tutorial," Canadian Conference on Electrical and Computer Engineering—Congres Canadien En Genie Electrique Et Informatique, vol. 1, Sep. 5, 1995; pp. 420-423, XP000618815; p. 421-p. 422.

J. Burbank et al., "The Network Time Protocol Version 4 Protocol Specification; draft-ietf-ntp-ntpv4-proto-02.txt", IETF Standard-Working-Draft, Internet Engineering Task Force, IETF, CH, vol. ntp, No. 2, Mar. 2006, XP015045008, ISSN: 0000-0004.

D. L. Mills, "Internet Time Synchronization: The Network Time Protocol", IEEE Transactions on Communications, IEEE Service Center, Piscataway, NY, US, vol. 39, No. 10, Oct. 1, 1991, pp. 1482-1493, XP000275311, ISSN: 0090-6778.

L.S. Liang, "Time Server In Advanced Automation Local Area Network", Computer Standards and Interfaces, Elsevier Sequoia, Lausanne,CH, vol. 6, No. 3, Jan. 1989,pp. 223-227, XP000112504, ISSN: 0920-5489.

"z/Architecture Principles of Operation," IBM Publication No. SA22-7832-04, Sep. 2005.

Office Action for U.S. Appl. No. 11/940,558 dated Sep. 3, 2009.

PCT Notification of Transmittal of the International Search Report and the Written Opinion of the International Searching Authority, or the Declaration; International Application No. PCT/EP2008/050620.

PCT Notification of Transmittal of the International Search Report and the Written Opinion of the International Searching Authority, or the Declaration; International Application No. PCT/EP2008/050739.

PCT Notification of Transmittal of the International Search Report and the Written Opinion of the International Searching Authority, or the Declaration; International Application No. PCT/EP2008/050524.

PCT Notification of Transmittal of the International Search Report and the Written Opinion of the International Searching Authority, or the Declaration; International Application No. PCT/EP2008/050482.

Office Action for U.S. Appl. No. 11/876,152 dated Oct. 15, 2009.

Office Action for U.S. Appl. No. 11/876,199 dated Oct. 26, 2009.

Office Action for U.S. Appl. No. 11/876,240 dated Oct. 26, 2009.

Office Action for U.S. Appl. No. 11/940,518 dated Oct. 15, 2009.

Final Office Action for U.S. Appl. No. 11/876,240 dated Mar. 19, 2010.

U.S. Appl. No. 12/748,539, filed Mar. 29, 2010, entitled "Channel Subsystem Server Time Protocol Commands," Carlson et al.

Final Office Action for U.S. Appl. No. 11/940,518 dated Apr. 2, 2010.

\* cited by examiner

ESTABLISHING A LOGICAL PATH BETWEEN SERVERS IN A COORDINATED TIMING NETWORK

CROSS-REFERENCE TO RELATED APPLICATIONS

This application claims priority to U.S. Provisional Application No. 60/887,576, entitled "METHOD AND SYSTEM FOR ESTABLISHING A LOGICAL PATH BETWEEN SERVERS IN A COORDINATED TIMING NETWORK", filed Jan. 31, 2007, which is hereby incorporated herein by reference in its entirety.

TECHNICAL FIELD

This invention relates, in general, to establishing a logical path between servers in a processing environment, and, more particularly, to establishing a logical path between servers in a coordinated timing network that enables servers in the coordinated timing network to synchronize to a reference time.

BACKGROUND OF THE INVENTION

For performance and data integrity, computing systems that access shared data, such as a SYSPLEX offered by International Business Machines Corporation, Armonk, N.Y., must be able to maintain time of day (TOD) clock synchronization to an accuracy that is better than best case communication time between the systems. Currently, in one example, to meet the synchronization requirements, a timer, such as the IBM® 9037 SYSPLEX timer, is used. This timer requires expensive dedicated timing links and a separate external box.

Other networks, such as the Network Timing Protocol (NTP), provide time synchronization, but do not meet the accuracy requirements of high-end systems. NTP requires that each server has access to an external time source that provides accuracy to a microsecond level in order to ensure all servers synchronize to the same reference time. This is a problem for those systems that do not have a capability to attach to external time servers that provide this level of accuracy. Further, a requirement of GPS receivers or similar attachment on each system may be considered infeasible for maintenance, security and reliability reasons.

SUMMARY OF THE INVENTION

Based on the foregoing, a need exists for a capability that facilitates the providing of time synchronization in a processing environment. In one example, a need exists for a capability that establishes a logical path between two servers in a coordinated timing network, wherein the logical path may be utilized by the servers to exchange time synchronization messages to facilitate synchronization of the servers' clocks.

The shortcomings of the prior art are overcome and additional advantages are provided through the provision of at least one program storage device readable by a machine embodying at least one program of instructions executable by the machine to perform a method of establishing a logical path between two processing systems in a coordinated timing network of a processing environment. The method including, for instance, transmitting, by a processing system to an attached processing system, a request to establish a logical path between the processing system and the attached processing system, the logical path facilitating time synchronization of the processing system and the attached processing system; receiving, by the processing system, a response from the attached processing system indicating whether the attached processing system accepted the request transmitted by the processing system; receiving, by the processing system, another request transmitted by the attached processing system, the another request requesting to establish the logical path between the processing system and the attached processing system; transmitting, by the processing system to the attached processing system, another response indicating whether the processing system accepted the another request transmitted by the attached processing system; and establishing the logical path between the processing system and the attached processing system if the response indicates that the request was accepted by the attached processing system and if the another response indicates that the another request was accepted by the processing system.

Systems and methods relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In one aspect, the present invention provides a capability of establishing a logical path between two servers in a coordinated timing network of a processing environment. To establish a server-time-protocol (STP) logical path to an attached server in the coordinated timing network, a server transmits a request to establish an STP logical path in a message command block to an attached server. The attached server processes information in the message command block for compatibility with the attached server's configuration and transmits a response in a message response block to the server indicating whether the attached server accepted the request transmitted by the server. In addition, the attached server transmits a request in a message command block to the server, requesting to establish a server-time-protocol logical path to the server. The server receives the request from the attached server and determines whether information in the message command block is compatible with the server's configuration. The server transmits a response in a message response block to the attached server indicating whether the server accepted the request transmitted by the attached server. If the attached server's response indicates that the server's request was accepted by the attached server and if the server's response indicates that the attached server's request was accepted by the server, a logical path is established between the server and the attached server.

Figure 1:
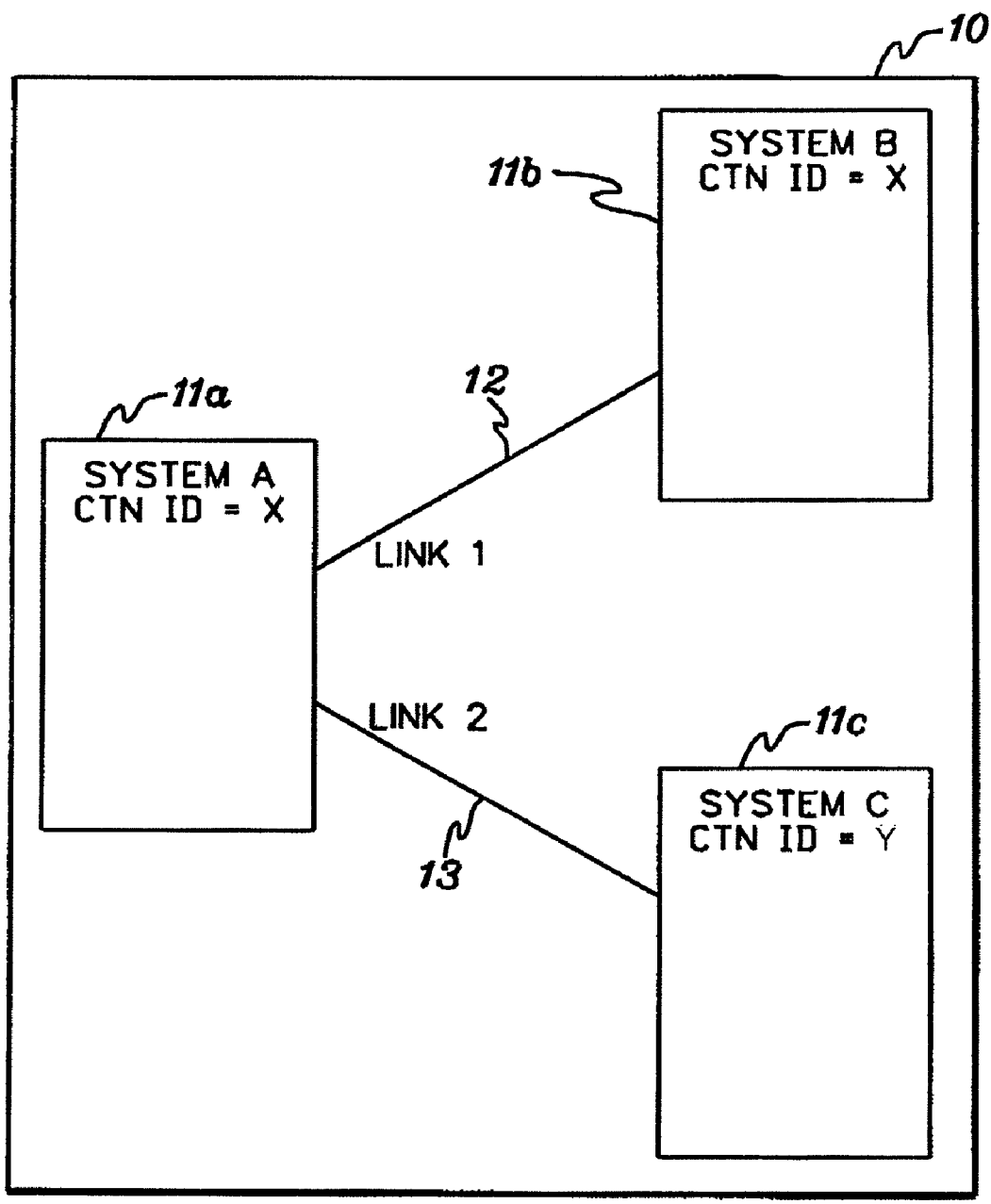
FIG. 1 depicts one embodiment of a processing environment incorporating and using one or more aspects of the present invention.

FIG. 1 depicts one embodiment of a processing environment incorporating and using one or more aspects of the present invention. In one embodiment, processing environment 10 includes a coordinated time network that includes two or more processing systems. In the example of FIG. 1, processing environment 10 includes processing system 11a, processing system 11b, and processing system 11c. Processing system 11a and processing system 11b are coupled to physical link 12, processing system 11a and processing system 11c are coupled to physical link 13. Processing system 11a has a coordinated time network identification (CTN ID) parameter equal to a value X, and processing system 11b also has a CTN ID equal to the value X, whereas processing system 11c has a CTN ID equal to the value Y in the example of FIG. 1. In accordance with an aspect of the present invention, processing system 11a and processing system 11b may establish a logical path over physical link 12 because their CTN ID parameter values match, whereas processing systems 11a and 11c may not establish a logical path between them because their CTN ID parameter values do not match. An example of a coordinated time network may include processing system 11a, processing system 11b, and physical link 12. Processing systems 11a, 11b, and 11c may be computer servers, for example.

Figure 2:
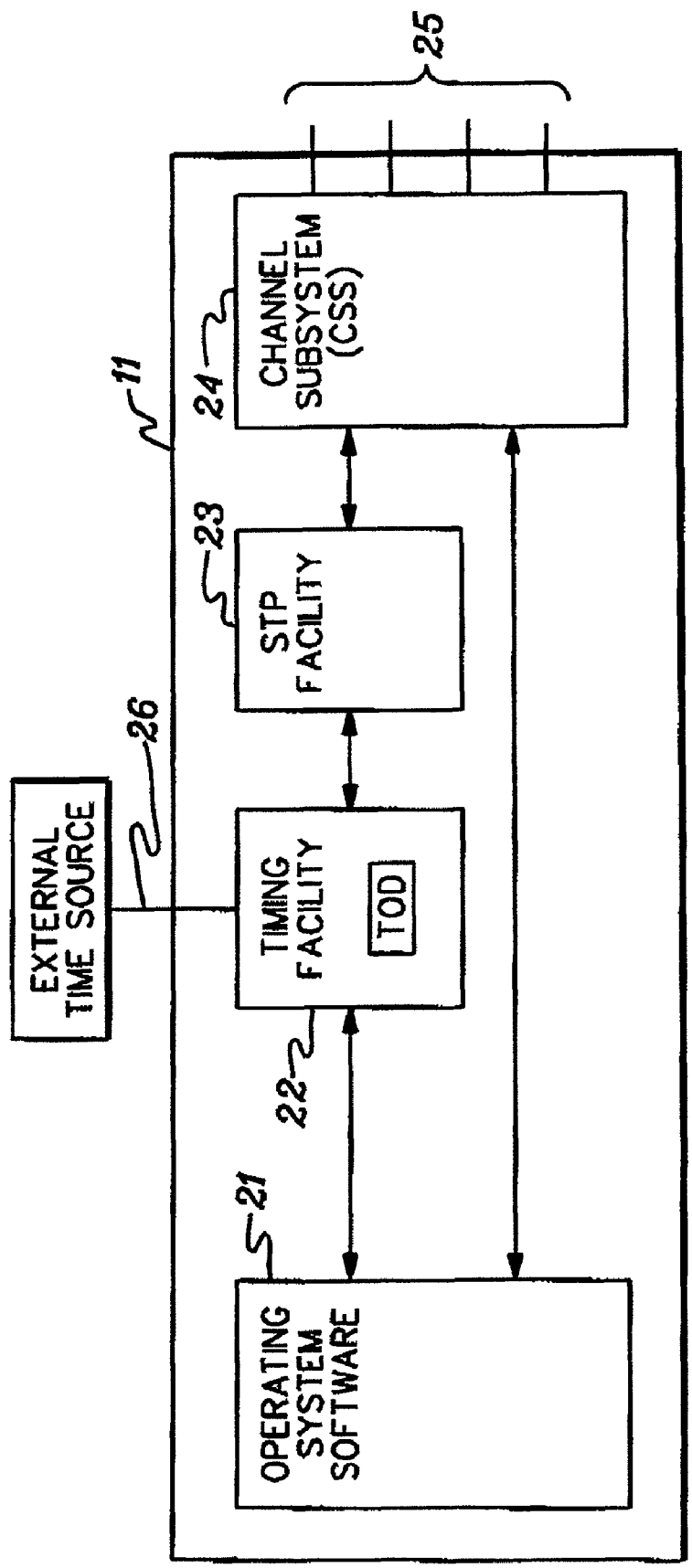
FIG. 2 depicts one embodiment of a processing system of FIG. 1, in accordance with an aspect of the present invention.

FIG. 2 depicts one embodiment of a processing system 11 of processing environment 10, in accordance with an aspect of the present invention. As illustrated in FIG. 2, processing system 11 comprises operating system 21 that is coupled to timing facility 22 and to channel subsystem (CSS) 24. Processing system 11 further comprises server timing protocol (STP) facility 23, which is coupled to timing facility 22 and to channel subsystem 24. Channel subsystem 24 is coupled to external links 25 to facilitate communication between processing system 11 and other external systems or nodes of the processing environment. Timing facility 22 may optionally be coupled to an external time source via external link 26.

One aspect of the present invention provides a method for establishing a logical path between two servers for timing synchronization using intersystem coupling links of the computing environment. For timing synchronization between servers, a physical link by itself is not sufficient. In addition, the servers at either end of the link are to satisfy a set of well-defined criteria before the link can be regarded as established as a path that can be used for timing-synchronization purposes. Other aspects of the present invention include the definition of these criteria and a protocol by which the exchange of establish-STP-path (ESP) messages between the two servers is initiated and brought to a conclusion.

In one embodiment, only one server-time-protocol (STP) path is established over any given physical link, and it is strictly a connection between the servers (or other processing systems). The STP facility at one central electronic complex (CEC) of a processing system is to exchange timekeeping messages with the STP facility at another CEC of another processing system. An STP path can be established over every physical link connecting one CEC with another. However, in accordance with an aspect of the present invention, a capability for establishing a server-time-protocol path between central electronic complexes includes checks so that a coordinated timing network (CTN) only includes those servers that belong there. A technique, in accordance with an aspect of the invention, also acts to make sure that every server that belongs in the CTN is, in fact, included in the CTN.

Figure 3A:
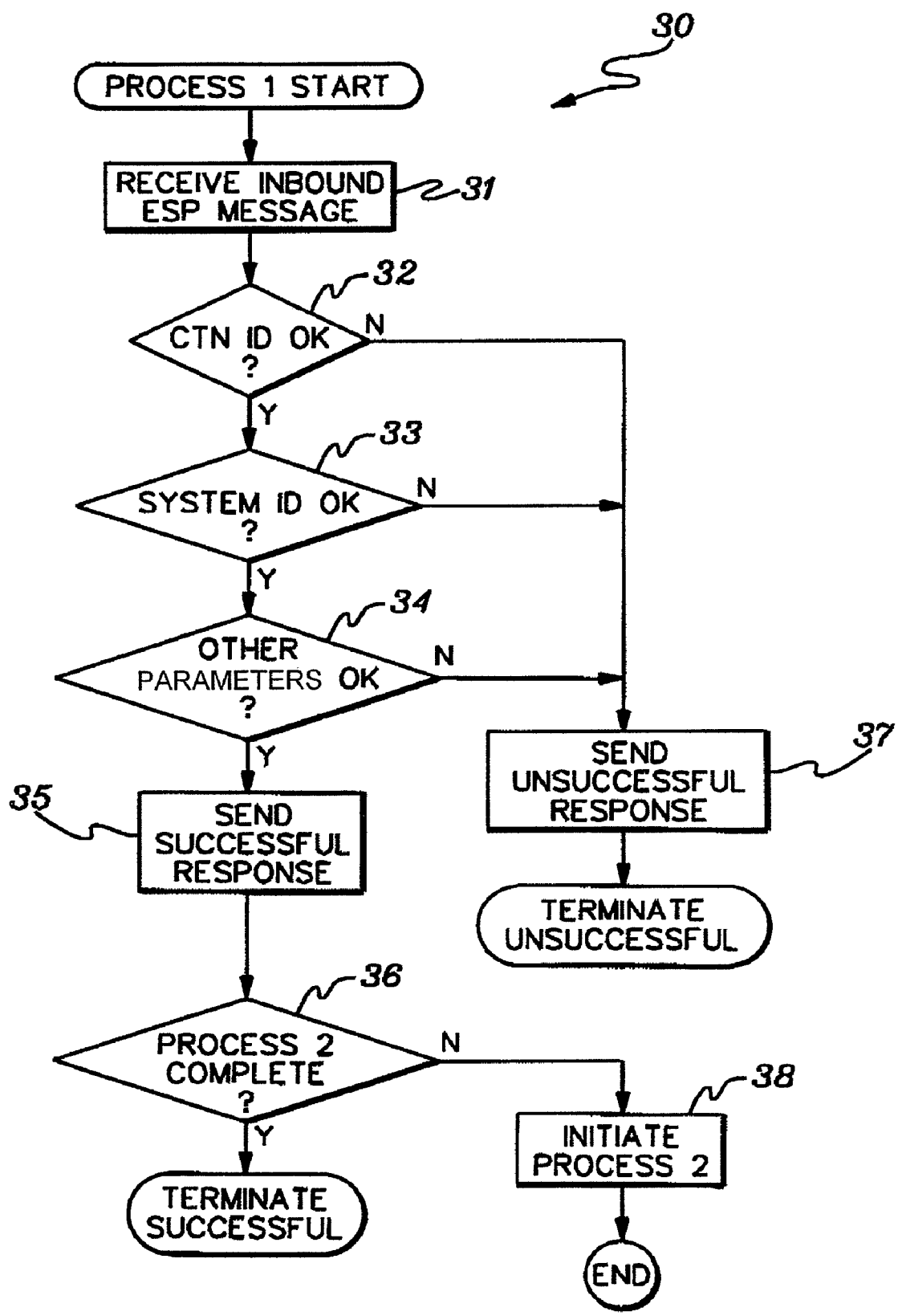
FIG. 3A depicts a flow diagram of a process for processing a received command message to establish a server-timing-protocol path between processing systems, in accordance with an aspect of the present invention.
Figure 3B:
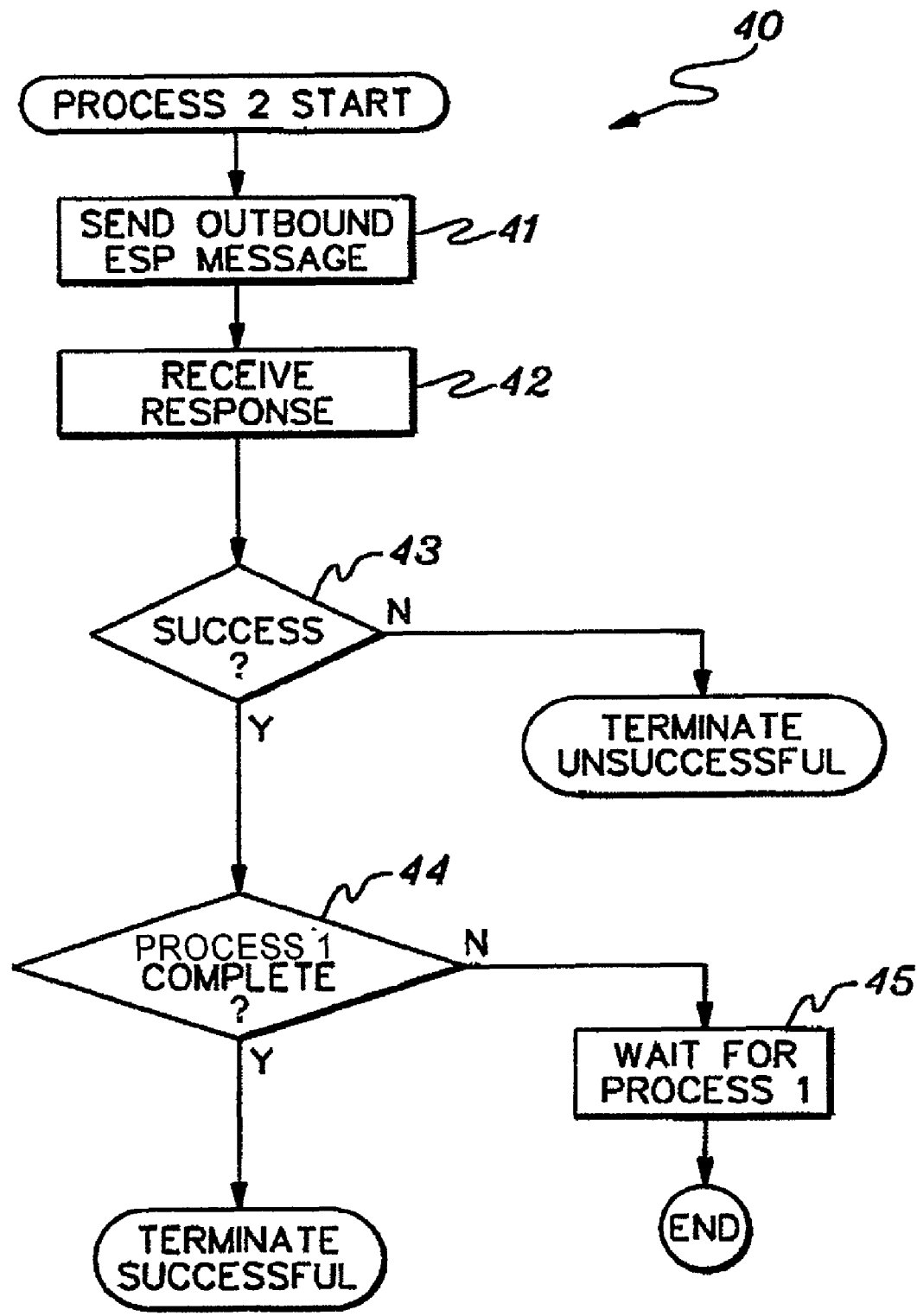
FIG. 3B depicts a flow diagram of a process for processing relating to transmitting a command message to establish a server-timing-protocol path between processing systems and receiving a response to the command message, in accordance with an aspect of the present invention.

FIGS. 3A and 3B depict flow diagrams for two processes run by an STP facility of a processing system such as a computer server, for example. A first process illustrated by flow diagram 30 in FIG. 3A begins when the server's channel subsystem receives a command message to establish an STP path 31. In response to receiving this command message, processing by the server's STP facility compares the server's CTN ID with the CTN ID of the attached server that transmitted the command message (step 32). If the CTN ID parameter values of the attached server, which transmitted the command message, and the server, which received the command message, match, processing continues with a comparison of the server's system identification parameter to the attached server's system identification parameter (step 33) (e.g., node descriptor). If the system identification parameter comparison does not produce an exception condition (for example, the transmitting attached server and receiving server have the same system identification parameter value because the physical link carrying the command message couples to the server in a loop), other parameters of the server and attached server are compared for compatibility in step 34. The other parameters checked in step 34 may include the following: a parameter indicating whether an STP facility is supported or enabled at a server, a parameter indicating a server's version of the STP facility, or a parameter indicating the server's configuration type.

If any of the comparisons in steps 32, 33, and 34 produce an exception condition, the server sends a response message to the attached server with a response code (RC) indicating that the command message was unsuccessful 37, and the first process of the STP facility terminates unsuccessfully. Otherwise, the server sends a response message to the attached server including a response code indicating that the command message was successful 35 (i.e., accepted by the server), and the first process checks whether a second process of the STP facility has completed 36. If the second process has completed, the first process terminates successfully. Alternatively, if the second process has not completed, the first process initiates the second process 38 before the first process ends.

FIG. 3B depicts a flow diagram of a second process of a server's STP facility. The second process relates to processing associated with a server transmitting a command message to an attached server to establish a server-timing-protocol path between processing systems and receiving a response to this command message, in accordance with an aspect of the present invention. A second process of an STP facility illustrated by flow diagram 40 in FIG. 3B begins with the server transmitting a command message to an attached server to establish an STP path between the server and the attached server 41. Processing continues with the server receiving a response message from the attached server 42. In step 43, the processing determines whether the response code included in the response message indicates that the server's command message was processed successfully by the attached server. If not, the second process terminates unsuccessfully. However, if response message's RC indicates that the server's command message was processed successfully by the attached server, the second process determines whether the first process of the STP facility has completed 44. If the first process has completed, the second process terminates successfully, but if the first process has not completed, the second process waits for the first process to complete 45 and ends.

Figure 4A:
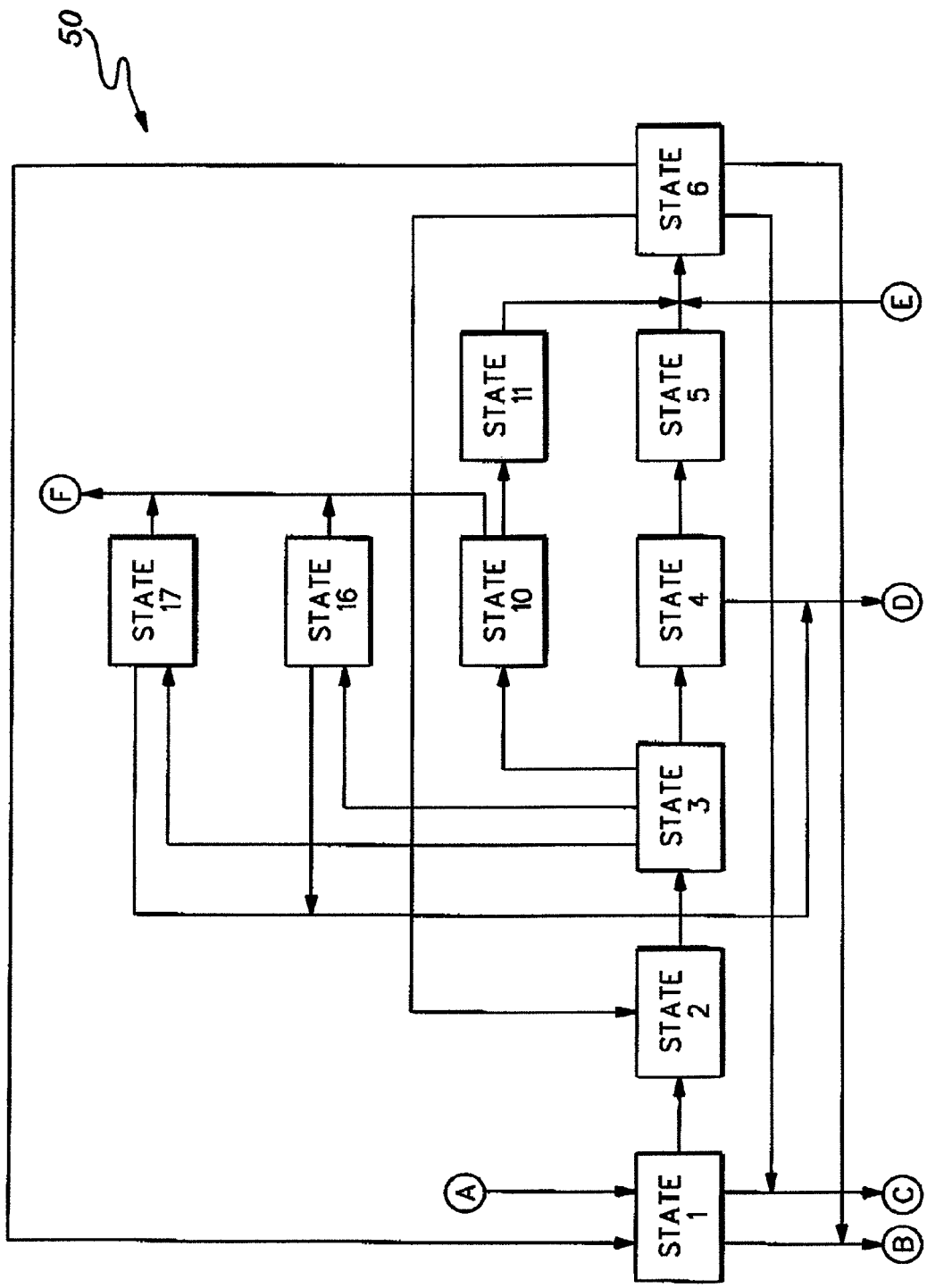
FIGS. 4A and 4B depict a state transition diagram for one embodiment of establishing an STP path between two servers of a coordinated timing network, in accordance with an aspect of the present invention.
Figure 4B:
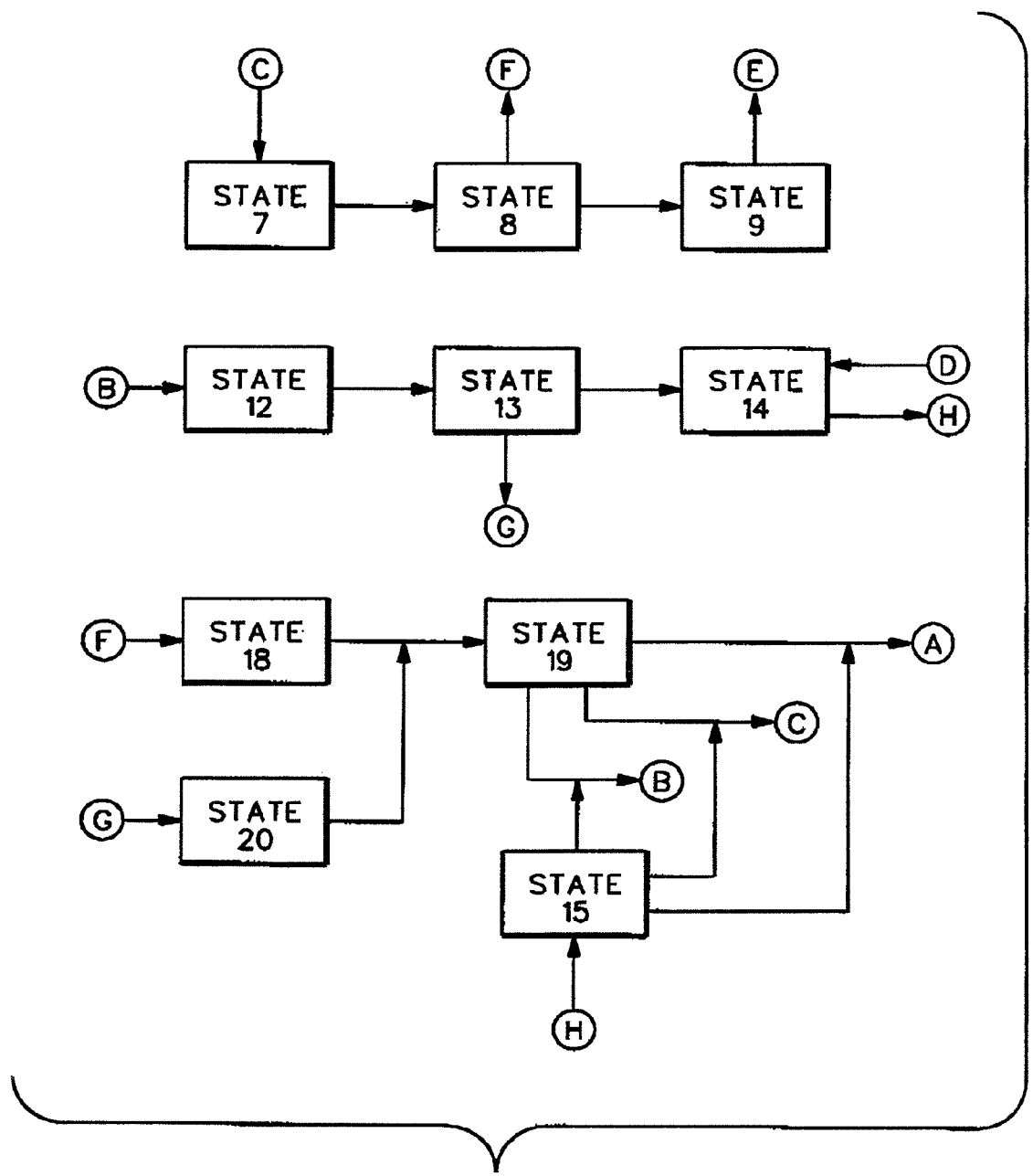

FIGS. 4A and 4B illustrate a state transition diagram 50 for one embodiment of establishing an STP path between two servers of a coordinated timing network. The states of the state transition diagram illustrated in FIGS. 4A and 4B are defined by the following state variables: initialization variable (I); uninitialized reason code (URC), ESP MCB sent, which indicates whether an establish-STP-path message command block (ESP MCB) has been sent by a server; ESP MRB received, which indicates whether an establish-STP-path message response block (ESP MRB) has been received by the server from an attached server; ESP MCB received, which indicates whether an establish-STP-path message command block has been received by the server from the attached server; ESP MRB sent, which indicates whether an establish-STP-path message response block has been sent by the server; and ESP RC, which is a response code that is included in an ESP MRB to indicate whether an ESP MCB was successfully processed by the server that received the ESP MCB. Table 1 below summarizes the values of the state variables for the states shown in the state transition diagram of FIGS. 4A and 4B.

TABLE 1

| State | | State Variable Values |
|---|---|---|
| 1. | I = | Uninitialized |
| | URC = | Offline/fenced/failed |
| | ESP MCB sent = | 0 |
| | ESP MRB received = | 0 |
| | ESP MCB received = | 0 |
| | ESP MRB sent = | 0 |
| | ESP RC = | N/A |
| 2. | I = | Uninitialized |
| | URC = | Communication timeout OR initialization not complete |
| | ESP MCB sent = | 0 |
| | ESP MRB received = | 0 |
| | ESP MCB received = | 0 |
| | ESP MRB sent = | 0 |
| | ESP RC = | N/A |
| 3. | I = | Uninitialized |
| | URC = | Communication timeout OR initialization not complete |
| | ESP MCB sent = | 1 |
| | ESP MRB received = | 0 |
| | ESP MCB received = | 0 |
| | ESP MRB sent = | 0 |
| | ESP RC = | N/A |
| 4. | I = | Uninitialized |
| | URC = | Incoming ESP pending |
| | ESP MCB sent = | 1 |
| | ESP MRB received = | 1 |
| | ESP MCB received = | 0 |
| | ESP MRB sent = | 0 |
| | ESP RC = | Successful |
| 5. | I = | Uninitialized |
| | URC = | Incoming ESP pending |
| | ESP MCB sent = | 1 |
| | ESP MRB received = | 1 |
| | ESP MCB received = | 1 |
| | ESP MRB sent = | 1 |
| | ESP RC = | Successful |
| 6. | I = | Initialized |

TABLE 1-continued

| State | | State Variable Values |
|---|---|---|
| | URC = | 0 |
| | ESP MCB sent = | 0 |
| | ESP MRB received = | 0 |
| | ESP MCB received = | 0 |
| | ESP MRB sent = | 0 |
| | ESP RC = | Successful |
| 7. | I = | Uninitialized |
| | URC = | Outgoing ESP pending |
| | ESP MCB sent = | 0 |
| | ESP MRB received = | 0 |
| | ESP MCB received = | 1 |
| | ESP MRB sent = | 1 |
| | ESP RC = | Successful |
| 8. | I = | Uninitialized |
| | URC = | Outgoing ESP pending |
| | ESP MCB sent = | 1 |
| | ESP MRB received = | 0 |
| | ESP MCB received = | 1 |
| | ESP MRB sent = | 1 |
| | ESP RC = | Successful |
| 9. | I = | Uninitialized |
| | URC = | Outgoing ESP pending |
| | ESP MCB sent = | 1 |
| | ESP MRB received = | 1 |
| | ESP MCB received = | 1 |
| | ESP MRB sent = | 1 |
| | ESP RC = | Successful |
| 10. | I = | Initialization not complete OR uninitialized |
| | URC = | Communication timeout OR Initialization not complete |
| | ESP MCB sent = | 1 |
| | ESP MRB received = | 0 |
| | ESP MCB received = | 1 |
| | ESP MRB sent = | 1 |
| | ESP RC = | Successful |
| 11. | I = | Initialization not complete OR uninitialized |
| | URC = | Communication timeout OR Initialization not complete |
| | ESP MCB sent = | 1 |
| | ESP MRB received = | 1 |
| | ESP MCB received = | 1 |
| | ESP MRB sent = | 1 |
| | ESP RC = | Successful |
| 12. | I = | Uninitialized |
| | URC = | Outgoing ESP pending (with a couple of exceptions) |
| | ESP MCB sent = | 0 |
| | ESP MRB received = | 0 |
| | ESP MCB received = | 1 |
| | ESP MRB sent = | 1 |
| | ESP RC = | Bad RC from sent MRB |
| 13. | I = | Uninitialized |
| | URC = | Outgoing ESP pending |
| | ESP MCB sent = | 1 |
| | ESP MRB received = | 0 |
| | ESP MCB received = | 1 |
| | ESP MRB sent = | 1 |
| | ESP RC = | Bad RC from sent MRB |
| 14. | I = | Uninitialized |
| | URC = | Incoming ESP reject |
| | ESP MCB sent = | 1 |
| | ESP MRB received = | 1 |
| | ESP MCB received = | 1 |
| | ESP MRB sent = | 1 |
| | ESP RC = | Bad RC from sent MRB |
| 15. | I = | Uninitialized |
| | URC = | Incoming ESP reject |
| | ESP MCB sent = | 0 |
| | ESP MRB received = | 0 |
| | ESP MCB received = | 0 |
| | ESP MRB sent = | 0 |
| | ESP RC = | Bad RC from sent MRB |
| 16. | I = | Uninitialized |
| | URC = | Incoming ESP reject |
| | ESP MCB sent = | 1 |

TABLE 1-continued

| State | | State Variable Values |
|---|---|---|
| | ESP MRB received = | 0 |
| | ESP MCB received = | 1 |
| | ESP MRB sent = | 1 |
| | ESP RC = | Bad RC from sent MRB |
| 17. | I = | Uninitialized |
| | URC = | Outgoing ESP reject |
| | ESP MCB sent = | 1 |
| | ESP MRB received = | 1 |
| | ESP MCB received = | 0 |
| | ESP MRB sent = | 0 |
| | ESP RC = | Bad RC from received MRB |
| 18. | I = | Uninitialized |
| | URC = | Outgoing ESP reject |
| | ESP MCB sent = | 1 |
| | ESP MRB received = | 1 |
| | ESP MRB sent = | 1 |
| | ESP RC = | Bad RC from received MRB |
| 19. | I = | Uninitialized |
| | URC = | Outgoing ESP reject |
| | ESP MCB sent = | 0 |
| | ESP MRB received = | 0 |
| | ESP MCB received = | 0 |
| | ESP MRB sent = | 0 |
| | ESP RC = | Bad RC from received MRB |
| 20. | I = | Uninitialized |
| | URC = | Outgoing ESP reject |
| | ESP MCB sent = | 1 |
| | ESP MRB received = | 1 |
| | ESP MCB received = | 1 |
| | ESP MRB sent = | 1 |
| | ESP RC = | Bad RC from received MRB |

When the server process for establishing an STP path reaches State 6 of the state transition diagram illustrated in FIGS. 4A and 4B, an STP path is established between the server and an attached server. Table 2 below summarizes the events that cause the state transitions illustrated in the state transition diagram of FIGS. 4A and 4B. Table 2 also lists actions taken by the server that are associated with the transitions.

TABLE 2

State Transition Table

| State Transition | Event |
|---|---|
| 1 to 2 | CSS taps STP facility because link is configured online. Locate LIB with SLID that matches SLID passed in by CSS. |
| 1 to 7 | ESP MCB arrives from AS, all checking successful. LIB ← CTN ID, ND, Max VN from MCB (save RAVN + SCIB from MCB) return MRB. |
| 1 to 12 | ESP MCB arrives from AS, not all checking successful. LIB ← CTN ID, ND, Max VN from MCB; return MRB. |
| 2 to 3 | Send ESP MCB to Att. Server (MCB includes CTN ID, Stratum, Max VN, RAVN, ND + SCIB) |
| 3 to 4 | ESP MRB arrives from AS with RC = successful |
| 3 to 10 | ESP MCB arrives from Att. Server, all checking successful. LIB ← CTN ID, ND, Max VN (save RAVN + SCIB from MCB) return MRB |
| 3 to 16 | ESP MCB arrives from Att. Server, not all checking successful. LIB ← CTN ID, ND, Max VN from MCB, return MRB |
| 3 to 17 | ESP MRB arrives from Att. Server with RC not = successful |
| 4 to 5 | ESP MCB arrives from AS, all checking successful. LIB ← CTN ID, ND, Max VN from MCB (save RAVN + SCIB from MCB) return MRB |
| 4 to 14 | ESP MCB arrives from AS, not all checking successful |
| 5 to 6 | Create/modify NIB and ASSIB; determine active VN, if appropriate; adopt SCIB, if appropriate. |
| 6 to 1 | CSS taps STP facility because link is configured offline or link is fenced or link has failed. Locate LIB with SLID that matches SLID passed in by CSS |
| 6 to 2 | Communication error detected on all links to Att. Server. NIB associated with ATT. Server is "deleted." |
| 6 to 7 | ESP MCB arrives from AS, all checking successful. LIB ← CTN ID, ND, Max VN from MCB (save RAVN + SCIB from MCB); return MRB. |
| 6 to 12 | ESP MCB arrives from AS, not all checking successful. LIB ← CTN ID, ND, Max VN from MCB, return MRB. |
| 7 to 8 | Send ESP MCB to Att. Server. (MCB includes CTN ID, Stratum, Max VN, RAVN, ND, + SCIB) |
| 8 to 9 | ESP MRB arrives from AS with RC = successful. |
| 8 to 18 | ESP MRB arrives from AS with RC not = successful. |
| 9 to 6 | Create/modify NIB and ASSIB; determine active VN, if appropriate; adopt SCIB, if appropriate. |
| 10 to 11 | ESP MRB arrives from AS with RC = successful. |
| 10 to 18 | ESP MRB arrives from AS with RC not = successful. |
| 11 to 6 | Create/modify NIB and ASSIB; determine active VN, if appropriate; adopt SCIB, if appropriate. |
| 12 to 13 | Send ESP MCB to Att. Server. (MCB includes CTN ID, Stratum, Max VN, RAVN, ND, + SCIB) |
| 13 to 14 | ESP MRB arrives from AS with RC = successful. |

TABLE 2-continued

State Transition Table

| State Transition | Event |
|---|---|
| 13 to 20 | ESP MRB arrives from AS with RC not = successful. |
| 14 to 15 | Automatic. |
| 15 to 1 | CSS taps STP facility because link is configured offline or link is fenced or link has failed.<br>Locate LIB with SLID that matches SLID passed in by CSS |
| 15 to 7 | ESP MCB arrives from AS, all checking successful.<br>LIB ← CTN ID, ND, Max VN from MCB (save RAVN + SCIB from MCB); return MRB |
| 15 to 12 | ESP MCB arrives from AS, not all checking successful.<br>LIB ← CTN ID, ND, Max VN from MCB; return MRB. |
| 16 to 14 | ESP MRB arrives from AS with RC = successful. |
| 16 to 18 | ESP MRB arrives from AS with RC not = successful. |
| 17 to 14 | ESP MCB arrives from AS, not all checking successful |
| 17 to 18 | ESP MCB arrives from AS, all checking successful |
| 18 to 19 | CTN ID = 0, Max VN = 0, Active VN = 0 or CTN ID = CTN ID from MRB, depending. |
| 19 to 1 | CSS taps STP facility because link is configured offline or link is fenced or link has failed.<br>Locate LIB with SLID that matches SLID passed in by CSS |
| 19 to 7 | ESP MCB arrives from AS, all checking successful.<br>LIB ← CTN ID, ND, Max VN from MCB (some RAVN + SCIB from MCB); return MRB. |
| 19 to 12 | ESP MCB arrives from AS, not all checking successful.<br>LIB ← CTN ID, ND, Max VN from MCB; return MRB. |
| 20 to 19 | CTN ID = 0, Max VN = 0, Active VN = 0 or CTN ID = CTN ID from MRB, depending. |

In one embodiment, the process of establishing an STP path normally begins when a physical link between two servers is configured online. This event causes the channel subsystem (CSS) to invoke the STP facility at each of the two servers, and the link in question is investigated to determine its suitability as an STP path.

There are several situations in which an STP path will not be established on a physical link between two servers. The situation in which an STP path will not be established include the following: (1) the STP facility is not supported or is not enabled at one or both of the servers connected by that physical link; (2) the two servers connected by the physical link belong to different coordinated timing networks; (3) the versions of the STP facility at the servers connected by the physical link are not compatible; (4) the configuration type (for example, triad, dual-server, single-server, or null configuration) at one of the two servers connected by the physical link is not compatible with the configuration type at the other server; and (5) a server is connected to itself by the physical link.

The process of establishing an STP path, which is also referred to herein as the establish STP path process or ESP process, may also be initiated under circumstances other than the link entering the physical-link-operational state. The ESP process may be initiated, for example, when the coordinated timing network identification (CTN ID) at a server has changed as the result of a local modify-CTN-ID command, or when the maximum-supported STP version number at a server has changed, or when the stratum-1 configuration at a server has changed as the result of a local modify-stratum-1-configuration command. Another example of a case in which the ESP process is initiated without explicit prompting by elements of the channel subsystem (CSS) involves the action that is taken when an attached server fails to respond to an exchange time parameters (XTP) command on any path within the path group associated with that attached server for some specified period of time. Every path to the attached server in question is placed in the uninitialized state (with uninitialized reason code equal to "communication error"), causing an establish-STP-path (ESP) command to be sent to the attached server on every path at the completion of every message interval until a response has been received or until the CSS signals that the paths to the attached server have been configured offline or that these paths are otherwise unavailable for use by the STP facility.

When the ESP process completes successfully for a given physical link, an STP control block called the link information block (LIB) is placed in the initialized state. If this is the first STP path to the attached server to enter the initialized state, then a node information block (NIB) is created for this attached server.

One characteristic of a technique of establishing a logical path between two servers, in accordance with an aspect of the present invention, is that an exchange of signals between the two servers may be initiated and proceed in any order. That is, although each of the two servers sends a message of a particular type and receives a response to that message, the order in which these events occur is not significant. The protocol may be characterized as symmetrical, since each of the two servers engaged in the exchange of signals to establish a logical path will perform the same set of operations as a part of the process of establishing a path to use for timing-synchronization purposes. In order for the process of establishing an STP path to complete successfully on a given link, the STP facilities at both of the two servers connected by the link are to conclude that no exceptional conditions were encountered in the exchange of establish-STP-path commands.

In one embodiment, a server initiates a process for initializing and establishing a server-time-protocol path with an attached server as follows.

STP-Link-Monitoring Procedure

The STP-link-monitoring procedure determines all external data links attached to the server that may be used as STP links. For each link that is capable of acting as an STP link, the STP-link-monitoring procedure builds a link information block. The STP-link-monitoring procedure monitors the server's external data links for the addition and deletion of STP data links and for changes in the operational state of the links. When an STP link enters the physical-link-operational state (as defined for the type of physical link), the STP-link-monitoring procedure initiates the STP-path-initialization process.

The STP-Path Initialization Procedure

The STP-path-initialization procedure is performed on an STP path when the STP facility establishes initiative to perform path initialization. Initiative to perform STP path initialization on an STP link is established when the server is configured with a non-zero STP ID and any of the following occur:
 1. An STP link enters the initialization-not-complete state.
 2. An ESP command is received on the path.
 3. A link is in the initialization-not-complete state and initialization has not been attempted for the minimum message interval.

Initiative is established to perform STP path initialization on all STP links that are in the link-operational state when the server is configured with a non-zero STP ID and any of the following occur:
 1. The CTN ID at the server has changed as the result of a local modify-CTN ID command.
 2. The node descriptor at the server has changed.
 3. The maximum-supported STP version number at the server has changed.
 4. The stratum-1 configuration at the server has changed as the result of a local modify-stratum-1-configuration command.

STP path initialization includes the steps listed below. If any of the steps does not complete successfully, STP path initialization fails and none of the subsequent steps is performed.
 1. Perform the Establish STP Path procedure.
 2. If the link is in the initialized state, perform the following:
    a. If the attached node is not already in the network-node list, then add it to the list as an attached server and initialize the attached-server state information.
    b. Add the STP link identifier associated with this link to the attached-server path group.

Establish STP Path (ESP) Procedure

The ESP procedure is performed as part of STP path initialization. When the STP facility has established initiative to perform path initialization as the result of receiving an ESP message command on a link, the STP facility performs the following steps:
 1. Perform the ESP verification function to verify the data received in the ESP message command.
 2. If ESP verification is successful, send a successful response code in response to the ESP message command.
 3. If the link is in the incoming-ESP-command-pending state, put the link into the initialized state. Otherwise, perform the following:
    a. Put the link into the outgoing-ESP-command pending state.
    b. Send an ESP message command on the link.
    c. If the command completes successfully, put the link into the initialized state.
    d. If the command does not complete successfully, perform the following:
        i. Set the link to the uninitialized state.
        ii. Set the URC for the link to the outgoing-ESP-command-reject state.
        iii. Store the response code for the ESP command into the LIB.
        iv. Fail the ESP procedure.

When the STP facility has established initiative to perform path initialization, but not as a result of receiving an ESP message command, the STP facility performs the following steps:
 1. Send an ESP message command on the link.
 2. If the command completes successfully, set the URC for the link to the incoming-ESP-command-pending state. In this case, receipt of an ESP message command will establish initiative to complete path initialization.
 3. If the command does not complete successfully, perform the following:
    a. Set the link to the uninitialized state.
    b. Set the URC for the link to the outgoing-ESP-command-reject state
    c. Store the response code for the ESP command into the LIB.
    d. Fail the ESP procedure.

Link Information Block (LIB)

The Link Information Block is a control block for a link that is utilized in the process of establishing an STP path. All of the following fields are initially written by the CSS. The "I" bit and the "URC" field are subsequently managed by the STP facility to track the ESP process:

SLID="STP Link Identifier"—The SLID is obtained from the IOP at link-initialization time; and it is passed to the transport layer when there is a need to specify a particular link. It is like a token—the "functional" layer does not need to know its exact nature.

DESC="STP Link Descriptor"—This is used to distinguish between different types of links.

I="Initialized

URC="Uninitialized Reason Code"

The URC is valid when the STP path for this link is in the uninitialized state. The codes are in order of decreasing priority; when multiple error conditions exist, the lower code is reported for the link.

Offline: The physical link is in the offline state. A link in the offline state cannot be initialized for STP communication and is considered not operational.

Initialization Not Complete: The physical link is operational but link initialization has not been attempted or is in progress but has not entered a state indicating that an incoming ESP Command or an outgoing ESP Command is pending.

Link Failure: A link failure has been detected on the physical link. A link in the link-failure state cannot be initialized for STP communication and is considered not operational.

Fenced: The link is operational but has been put into the fenced state and cannot be initialized. A link in the fenced state cannot be initialized for STP communication and is considered not operational.

Incoming ESP Command Reject: The server responded to an ESP message command with a response code other than "successful". The response code sent to the attached server is stored in the "ESP response code" field.

Outgoing ESP Command Reject: The server received a response code other than "successful" to an ESP message command. The response code that was received from the attached server is stored in the "ESP response code" field.

Communication Error: A communication error has been recognized for the attached server indicating that the attached server has not communicated with this server for a period greater than the freewheel period.

Configuration Error: The attached server has provided a mismatched CTN ID on one of the paths to the attached server.

Removed Path: A remove-STP-path command has been received from the attached server.

No Response: An ESP command has been attempted but did not receive a response within the message timeout period.

Incoming ESP Command Pending: The server has received a response code of "successful" for an ESP command sent to the attached node and is waiting for an ESP command from the node to complete the path-initialization process.

Outgoing ESP Command Pending: The server has responded with a response code of "successful" to an ESP command from the attached node and sent an ESP command to the node to complete the path-initialization process.

These four fields of the Link Information Block are managed by the STP facility:

ESP Response Code: The ESP response code returned/received when the URC contains code "Incoming ESP Command Reject" or "Outgoing ESP Command Reject".

Stratum: The stratum level of the attached server.

Maximum Version: The highest STP version number supported by the attached node.

Active Version: The STP version number currently active at the attached node.

The contents of an ESP MCB transmitted by a server include:
1. This server's copy of the CTN ID
2. This server's node descriptor
3. This server's stratum
4. This server's maximum version number
5. This server's active version number
6. This server's copy of the stratum-1 configuration information block (SCIB)

When a link is configured online, the CSS invokes the STP facility at each of the two servers connected by means of that link. This means that an ESP MCB will originate at each of the two servers and that each of the two servers will eventually have to respond to the MCB from the other server by returning an ESP MRB to the other server. ("MRB" stands for "Message Response Block"—the control block used to respond to a message sent across an "intersystem coupling link".) In other words, the ESP process is "symmetrical" in the sense that each of the two servers involved in the process performs the operation in the same way, sending an MCB and receiving an MRB in return, and also receiving an MCB and responding by returning an MRB. The ESP process does not reach a successful conclusion until both of the two MCB/MRB exchanges have completed on the link in question with a response code indicating that no exceptional conditions have been encountered.

When the ESP MCB arrives at the remote-server end of the link, the STP facility at the remote server is invoked by the CSS and passed several parameters. Among these parameters are the SLID, the address of the MCB, and the address of the location in storage where the MRB is to be written. The SLID is used to locate the LIB associated with the link in question. The "ESP MCB received" flag is set. Now the MCB is studied to see if there is any reason why the ESP process should not be allowed to continue to a successful completion. This action is referred to as the "ESP Verification Function"; it is defined as follows.

ESP Verification Function

The "ESP verification Function" verifies that the request operands in the ESP message command permit path initialization. The following checks are performed on the operands in the ESP MCB:

1. If the CTN ID received in the ESP command does not match that of the server, the configuration-error response code is returned in the response block and the ESP procedure fails. The response code is stored in the LIB and the URC is set to the incoming-ESP-command-reject state.

2. If the node descriptor in the ESP command is invalid, the node-descriptor-error response code is returned in the response block and the ESP procedure fails. The response code is stored in the LIB and the URC is set to the incoming-ESP-command-reject state.

3. If the active STP version code in the ESP message command is not compatible with the receiving server's active version code, the unsupported-version-number response code is returned in the response block and the ESP procedure fails. The response code is stored in the LIB and the URC is set to the incoming-ESP-command-reject state.

4. If the stratutm-1 configuration in the ESP message command is not compatible with the receiving server's configuration, the stratum-1-configuration-error response code is returned in the response block and the ESP procedure fails. The response code is stored in the LIB and the URC is set to the incoming-ESP-command-reject state.

5. If a stratum-1-configuration error is detected, an island-condition machine check is reported. A stratum-1-configuration error indicates that two servers with the same CTN ID have different stratum-1 configurations.

If no exceptional conditions are encountered when processing a received ESP MCB, then the ESP MRB is written with a value of RC that indicates that the command was processed successfully. The only other response operand that is written in the ESP MRB is the receiving server's CTN ID. The CTN ID is written in the ESP MRB regardless of the value written in the RC operand.

In case one of the exceptional conditions was encountered, in general, the attached server is sent an ESP command in return, if this has not already been done. The situation is that the attached server has no way of knowing whether this server rejected the incoming ESP MCB before or after it sent an ESP MCB of its own. So when the attached server receives the MRB about to be returned, it would not know if it would be receiving an ESP MCB as well. By sending an ESP MCB in spite of the fact that the attached server's ESP MCB has been rejected, any doubt the attached server might otherwise have had about whether the ESP operation is complete is eliminated. In other words, the attached server is to wait for the ESP MCB from this server before completing the ESP process even if this server has rejected the ESP MCB from the attached server. There are several exceptions to this rule; all of them involve cases in which it is apparent that the server rejecting the ESP MCB that it received from the attached server would not under any circumstances be sending an ESP MCB of its own: the STP facility is not enabled at this server, the STP ID component of the CTN ID is zero, or the STP facility is busy.

To determine whether an ESP MCB should be sent to the attached server when the ESP MCB from the attached server has been rejected because of one of the exceptional conditions listed above, the "ESP MCB sent" flag is examined. If that flag is equal to zero, then the URC value in the LIB associated with the link on which the ESP command arrived is changed from "Incoming ESP Command Reject" to "Outgoing ESP Command Pending". The routine that scans the LIBs at the completion of every message interval looking for a link that requires ESP processing treats the URC value "Outgoing ESP Command Pending" the same way it treats the URC value "Initialization Not Complete"—an ESP command is sent to the attached server and the "ESP MCB sent" flag is set to one, just as described earlier for the URC="Initialization Not Complete" case. If, on the other hand, the "ESP MCB sent" flag is equal to one, then the ESP process is complete for the link in question. All that remains is to reset the four "state machine" flags in the LIB that keep track of the progress of the ESP process for the link in question: "ESP MCB sent", "ESP MRB received", "ESP MCB received", and "ESP MRB sent".

In case none of the exceptional conditions listed above was encountered, then it is possible that the ESP process has come to a successful conclusion for the link in question. All that is necessary is that this server has already sent the ESP MCB to the attached server and has received the ESP MRB returned by the attached server. Of course, it is also necessary that the attached server responded to the ESP command with the response code that indicates a successful outcome. In other words, the link-initialization process is not completed until the ESP MCB is sent to the attached server and the RC="successful" response has been received. If the ESP MCB has not been sent to the attached server and a response has not been received, then the link-initialization process will be concluded when the ESP MRB arrives from the attached server. The "ESP MCB sent" flag is examined; if it is equal to one, then the "ESP MRB received" flag is examined. If the "ESP MRB received" flag is equal to zero, then there is nothing to do but wait for the ESP MRB to arrive from the attached server. If, however, the "ESP MRB received" flag is equal to one, then the ESP process for the link in question will be concluded immediately. But suppose for a moment that the "ESP MCB sent" flag is equal to zero. In that case, the URC value in the LIB associated with the link in question is set to "Outgoing ESP Command Pending"; that will cause an ESP command to be sent to the attached server at the end of the current message interval.

Now, returning to the case in which no exceptions were encountered during the execution of the ESP Verification Function as described above and both the "ESP MCB sent" flag and the "ESP MRB received" flag are found to be equal to one, the possibility that the ESP MCB sent by this server was rejected by the attached server is considered. In other words, even though this server found nothing wrong with the ESP command it received from the attached server, the attached server rejected the ESP command sent to it by this server by returning an ESP MRB containing one of the exceptional response codes listed above. If that has in fact happened, then the value "Outgoing ESP Command Reject" will be found in the URC field of the LIB associated with the link in question. In that case, the ESP process is complete: the link will remain in the "uninitialized" state with the "I" bit in the LIB remaining equal to zero; and the URC value will continue to be "Outgoing ESP Command Reject".

There is another possibility to consider. The ESP MCB that was just received from the attached server was examined and found to have no exceptions. The receiving server will respond to that ESP command with RC="the command was successfully performed". The "ESP MCB sent" flag and the "ESP MRB received" flag are both equal to one. Finally, the URC field in the LIB associated with the link in question is examined and found to contain the value "Incoming ESP Command Pending", which means that the attached server responded to the ESP command from this server with RC="the command was successfully performed". The entire ESP process has completed successfully at this server for the link in question, and processing proceeds with the creation of a "node information block" (NIB) for the attached server that is connected to this server by the link in question. The NIB is an architected entity; but it is also a control block that contains other fields besides the objects specified in the STP architecture.

The following ESP processing occurs when the ESP MRB arrives in response to an ESP MCB that was sent earlier. The STP routine that is invoked by the CSS is passed the address of the MCB, the address of the MRB, and the SLID identifying the path on which the MRB arrived. The ESP-MRB-handling routine uses the SLID to find the right LIB in the LIB array. The "ESP MRB received" flag is immediately set to one in that LIB.

It is possible that a "communication timeout" will have occurred on the link when the ESP MCB was sent; the CSS will inform the STP facility of this outcome by passing the ESP-MRB-handling routine a "null" MRB address. The STP facility does not give up because of a "communication timeout". Instead, the URC field in the LIB in question is set to "No Response", which will cause the ESP MCB to be re-transmitted at the end of the current message interval. Also the "ESP MCB sent" and "ESP MRB received" flags are reset to zero.

But if the indication that a "communication timeout" has occurred is not present, and if the response code in the ESP MRB is "successful", then the next processing step depends on whether this server has received the ESP MCB from the attached server and what response code this server wrote in the ESP MRB it returned to the attached server. If this server has not yet received the ESP MCB from the attached server, then it is not possible, in this embodiment, to proceed with the ESP process; it is necessary to wait until the ESP MCB arrives from the attached server. At this point, the URC value is changed to "Incoming ESP Command Pending". The final ESP processing will be done by the routine, discussed above, that processes the ESP MCB when it arrives from the attached server.

If an RC="successful" ESP MRB has been received from the attached server and if the ESP MCB from the attached server also has already been processed, then the URC in the LIB associated with the link in question is examined. If the URC field contains the value "Incoming ESP Command Reject", then the ESP process for the link in question is over. The ESP process has failed for that link, and the link will remain in the "uninitialized" state. All that remains is to reset to zero the four flags that record the link's progress through the ESP process: "ESP MCB sent", "ESP MRB received", "ESP MCB received", and "ESP MRB sent". The idea is that the "bad result" MRB sent to the attached server earlier overrides the "good result" MRB just received from the attached server. Both servers are to agree about the outcome of the exchange of ESP commands on the link in question to establish an STP path.

If, on the other hand, an ESP MRB with an RC="successful" has been received from the attached server and if the server also already processed the ESP MCB from the attached server and if the URC field in the LIB does not contain the value "Incoming ESP Command Reject", then the process proceeds to completion just as described above: a new NIB and ASSIB is created if this is the first link to the attached server in question, the new path is included in the path group for the attached server, and so forth. At the end of that, the four flags that record the link's progress through the ESP process are also reset.

In one embodiment, one or more aspects of the present invention can be executed in a processing environment that is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety. In such an environment instructions and/or logic, which is specified in the z/Architecture® and designed to execute on a z/Architecture® machine, is emulated to execute on an architecture other than the z/Architecture®. One example of this processing environment is described with reference to FIGS. 5-6.

Figure 5:
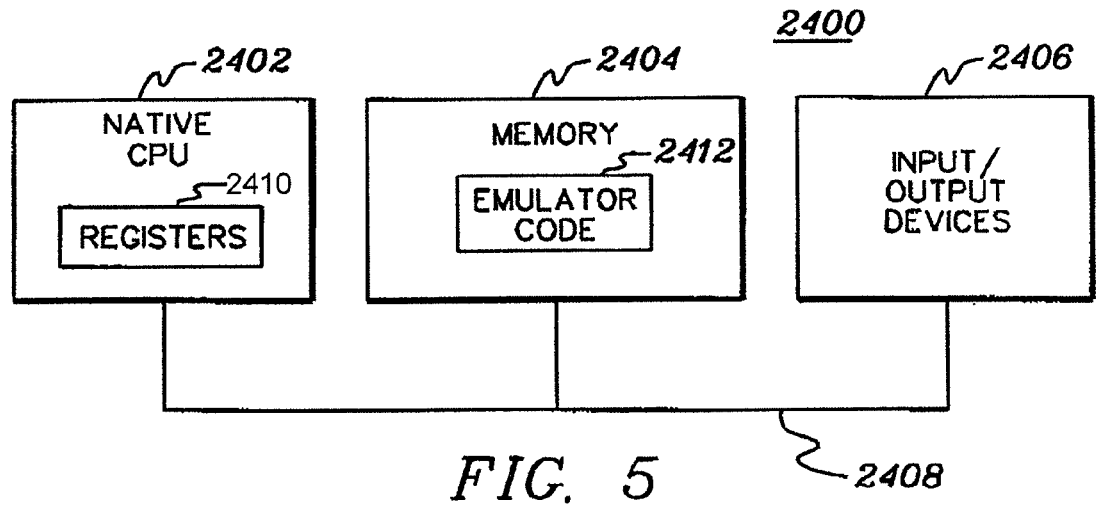
FIG. 5 depicts one embodiment of a processing environment to incorporate one or more aspects of the present invention.

Referring to FIG. 5, one embodiment of a processing environment to incorporate and use one or more aspects of the present invention is described. Processing environment 2400 includes, for instance, a native central processing unit 2402, a memory 2404 (e.g., main memory) and one or more input/output (I/O) devices 2406 coupled to one another via, for example, one or more buses 2408 and/or other connections. As examples, processing environment 2400 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 2402 includes one or more native registers 2410, such as one or more general purpose registers and/or one or more special purpose registers, used during processing within the environment. These registers include information that represent the state of the environment at any particular point in time.

Moreover, native central processing unit 2402 executes instructions and code that are stored in memory 2404. In one particular example, the central processing unit executes emulator code 2412 stored in memory 2404. This code enables the processing environment configured in one architecture to emulate another architecture. For instance, emulator code 2412 allows machines based on architectures other than the z/Architecture®, such as Power PC® processors, pSeries® servers, xSeries® servers, HP Superdome® servers, or others to emulate the z/Architecture® and to execute software and instructions developed based on the z/Architecture®.

Figure 6:
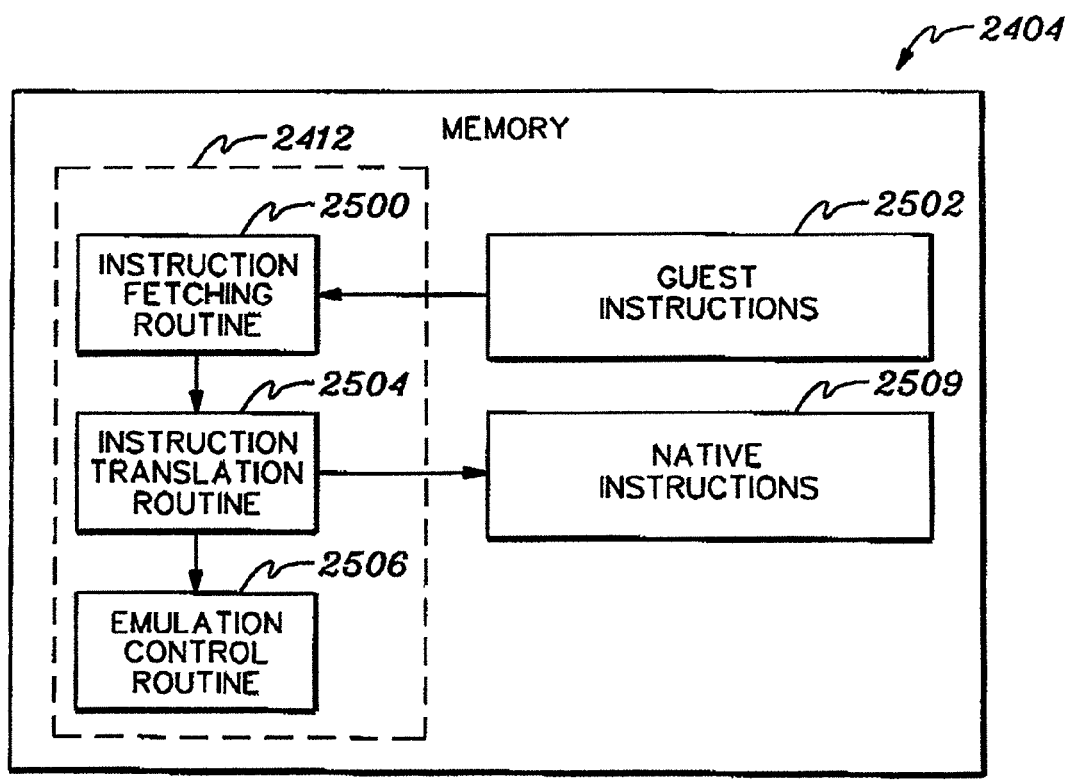
FIG. 6 depicts further details of the memory of FIG. 5, in accordance with an aspect of the present invention.

Further details relating to emulator code 2412 are described with reference to FIG. 6. Guest instructions 2502 comprise software instructions (e.g., machine instructions) that were developed to be executed in an architecture other than that of native CPU 2402. For example, guest instructions 2502 may have been designed to execute on a z/Architecture® processor, but are instead being emulated on native CPU 2402 (which may be for example an Intel® Itanium® 2 processor). In one example, emulator code 2412 includes an instruction fetching routine 2500 to obtain one or more guest instructions 2502 from memory 2404, and to optionally provide local buffering for the instruction obtained.

Emulator code 2412 further includes an instruction translation routine 2504 to determine the type of guest instruction that has been obtained and to provide one or more native instructions 2509 that correspond to the guest instruction. In one example, the providing includes creating during, for instance, a translation process, a native stream of instructions for a given guest instruction. This includes identifying the function and creating the equivalent native instructions. In a further example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

Emulator code 2412 further includes an emulation control routine 2506 to cause the native instructions to be executed. Emulation control routine 2506 may cause native CPU 2402 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 2509 may include loading data into a register from memory 2404; storing data back to memory from a register; or performing some type of arithmetic or logical operation, as determined by the translation routine. Each routine is, for instance, implemented in software, which is stored in memory and executed by the native central processing unit 2402. In other examples, one or more of the routines or operations are implemented in firmware, hardware, software or some combination thereof. The registers of the emulated guest processor may be emulated using the registers 2410 of the native CPU or by using locations in memory 2404. In embodiments, the guest instructions 2502, native instructions 2509, and emulation code 2412 may reside in the same memory or may be dispersed among different memory devices.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 7:
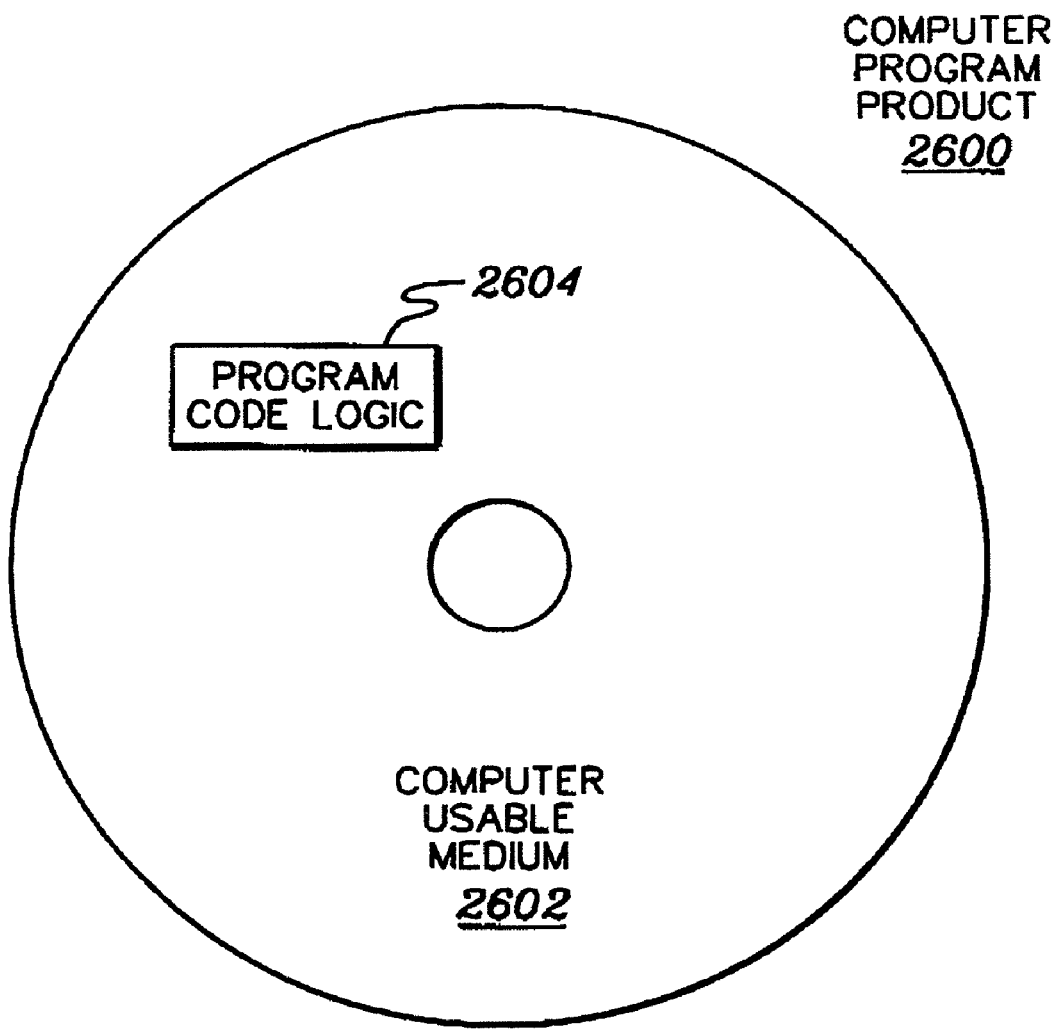
FIG. 7 depicts one example of a computer program product incorporating one or more aspects of the present invention.

One example of an article of manufacture or a computer program product incorporating one or more aspects of the present invention is described with reference to FIG. 7. A computer program product 2600 includes, for instance, one or more computer usable media 2602 to store computer readable program code means or logic 2604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Establishing a server-time-protocol (STP) logical path between processing systems of a processing environment, in accordance with an aspect of the present invention, facilitates the use of STP over high-speed, low latency links to provide the capability to synchronize all systems in the CTN to the accuracy of, for instance, a few microseconds when based on a reference time provided by a single server.

Additional information regarding timing networks is provided in the following patent applications, each of which is hereby incorporated herein by reference in its entirety: U.S. Provisional Serial No. 60/887,584 entitled "Facilitating Synchronization Of Servers In A Coordinated Timing Network", filed Jan. 31, 2007; U.S. Ser. No. 11/876,152 entitled "Facilitating Synchronization Of Servers In A Coordinated Timing Network", filed Oct. 22, 2007; U.S. Ser. No. 11/876,199 entitled "Definition Of A Primary Active Server In A Coordinated Timing Network", filed Oct. 22, 2007; U.S. Provisional Serial No. 60/887,562 entitled "Defining A Stratum-1 Configuration In A Coordinated Timing Network", filed Jan. 31, 2007; U.S. Ser. No. 11/876,240 entitled "Employing Configuration Information To Determine The Role Of A Server In A Coordinated Timing Network", filed Oct. 22, 2007; U.S. Provisional Serial No. 60/887,576 entitled "Method And System For Establishing A Logical Path Between Servers In A Coordinated Timing Network", filed Jan. 31, 2007; U.S. Provisional Serial No. 60/887,586 entitled "Facilitating Recovery In A Coordinated Timing Network", filed Jan 31, 2007; U.S. Ser. No. 11/876,323 entitled "Facilitating Recovery In A Coordinated Timing Network", filed Oct. 22, 2007; U.S. Provisional Serial No. 60/887,544 entitled "Channel Subsystem Server Time Protocol Commands", filed Jan. 31, 2007; U.S. Ser. No. 11/876,796 entitled "Channel Subsystem Server Time Protocol Commands and System Therefor," filed Oct. 23, 2007; U.S. Provisional Serial No. 60/887,512 entitled "Server Time Protocol Messages And Methods", filed Jan. 31, 2007; U.S. Ser. No. 11/940,518 entitled "Server Time Protocol Messages and Methods," filed Nov. 15, 2007; U.S. Ser. No. 11/468,352, entitled "Coordinated Timing Network Configuration Parameter Update Procedure," filed Aug. 30, 2006; U.S. Ser. No. 11/460,025, entitled "Directly Obtaining By Application Programs Information Usable In Determining Clock Accuracy," filed Jul. 26, 2006; U.S. Ser. No. 11/223,886, entitled "System And Method For TOD-Clock Steering;" U.S. Ser. No. 11/532,168, entitled "Synchronization Signal For TOD-Clock Steering Adjustment;" U.S. Ser. No. 11/468,501, entitled "Managing Data Access Via A Loop Only If Changed Locking Facility;" U.S. Ser. No. 11/223,878, entitled Clock Filter Dispersion;" U.S. Ser. No. 11/223,876, entitled "Method And System For Clock Skew And Offset Estimation;" U.S. Ser. No. 11/223,577, entitled "Use Of T4 Timestamps To Calculate Clock Offset And Skew;" and U.S. Ser. No. 11/223,642 entitled "System And Method For Calibrating A TOD Clock."

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for establishing a Server Time Protocol (STP) logical path between two processing systems in a coordinated timing network of a processing environment, the computer program product comprising:

a computer readable storage medium readable by a processor and storing instructions for execution by the processor for performing a method comprising:

transmitting, by a processing system to an attached processing system, a request to establish a server time protocol logical path between the processing system and the attached processing system, the server time protocol logical path facilitating time synchronization of the processing system and the attached processing system;

receiving, by the processing system, a response from the attached processing system indicating whether the attached processing system accepted the request transmitted by the processing system;

receiving, by the processing system, another request transmitted by the attached processing system, the another request requesting to establish the server time protocol logical path between the processing system and the attached processing system;

transmitting, by the processing system to the attached processing system, another response indicating whether the processing system accepted the another request transmitted by the attached processing; and establishing the server time protocol logical path between the processing system and the attached processing system, responsive to the response indicating that the request was accepted by the attached processing system and the another response indicating that the another request was accepted by the processing system.

2. The computer program product of claim 1, wherein the processing system comprises a server, and wherein the attached processing system comprises an attached server.

3. The computer program product of claim 1, wherein the method further comprises:

detecting whether a data communication link has been reconfigured since the server time protocol logical path was established on the data communication link; and re-initiating the transmitting, by the processing system to the attached processing system, of the request to establish the server time protocol logical path, responsive to the data communication link having been reconfigured.

4. The computer program product of claim 1, wherein the method further comprises determining whether the attached processing system has failed to respond to a command to exchange time parameters with the processing system within a pre-determined period of time; and initiating the transmitting, by the processing system to the attached processing system, of the request to establish the server time protocol logical path, responsive to the attached processing system having failed to respond to the command to exchange time parameters.

5. The computer program product of claim 1, wherein the method further comprises:

comparing a coordinated timing network (CTN) identification (ID) parameter value of the processing system and a CTN ID parameter value of the attached processing system; and refusing to accept the another request transmitted by the attached processing system to establish the server time protocol logical path, responsive to the CTN ID parameter value of the processing system being different from the CTN ID parameter value of the attached processing system.

6. The computer program product of claim 1, wherein the method further comprises:

comparing a system identification parameter value of the processing system and a system identification parameter value of the attached processing system; and refusing to accept the another request transmitted by the attached processing system to establish the server time protocol logical path, responsive to the system identification parameter value of the processing system is being identical to the system identification parameter value of the attached processing system.

7. The computer program product of claim 1, wherein the method further comprises:

comparing a version number parameter value of a time protocol facility of the processing system and a version number parameter value of a time protocol facility of the attached processing system; and refusing to accept the another request transmitted by the attached processing system to establish the server time protocol logical path, responsive to the comparing indicating that the processing system's time protocol facility is not compatible with the attached processing system's time protocol facility.

8. The computer program product of claim 1, wherein the method further comprises:

comparing a configuration block of a time protocol facility of the processing system and a configuration block of a time protocol facility of the attached processing system; and refusing to accept the another request transmitted by the attached processing system to establish the server time protocol logical path, responsive to the comparing indicating that the processing system's time protocol facility is not compatible with the attached processing system's time protocol facility.

9. The computer program product of claim 8, wherein the configuration block comprises a stratum-1 configuration block.

10. A computer system for establishing a Server Time Protocol (STP) logical path between two processing systems in a coordinated timing network of a processing environment, the computer system comprising:

a memory; and a processor in communications with the memory, wherein the computer system is configured to perform a method, said method comprising:

transmitting, by a processing system to an attached processing system, a request to establish a server time protocol logical path between the processing system and the attached processing system, the server time protocol logical path facilitating time synchronization of the processing system and the attached processing system;

receiving, by the processing system, a response from the attached processing system indicating whether the attached processing system accepted the request transmitted by the processing system;

receiving, by the processing system, another request transmitted by the attached processing system, the another request requesting to establish the server time protocol logical path between the processing system and the attached processing system;

transmitting, by the processing system to the attached processing system, another response indicating whether the processing system accepted the another request transmitted by the attached processing; and establishing the server time protocol logical path between the processing system and the attached processing system, responsive to the response indicating that the request was accepted by the attached processing system and the another response indicating that the another request was accepted by the processing system.

11. The computer system of claim 10, wherein the method further comprises:

detecting whether a data communication link has been reconfigured since the server time protocol logical path was established on the data communication link; and re-initiating the transmitting, by the processing system to the attached processing system, of the request to establish the server time protocol logical path, responsive to the data communication link having been reconfigured.

12. The computer system of claim 10, wherein the method further comprises:

determining whether the attached processing system has failed to respond to a command to exchange time parameters with the processing system within a pre-determined period of time; and initiating the transmitting, by the processing system to the attached processing system, of the request to establish the server time protocol logical path, responsive to the attached processing system having failed to respond to the command to exchange time parameters.

13. The computer system of claim 10, wherein the method further comprises:

comparing a coordinated timing network (CTN) identification (ID) parameter value of the processing system and a CTN ID parameter value of the attached processing system; and refusing to accept the another request transmitted by the attached processing system to establish the server time protocol logical path, responsive to the CTN ID parameter value of the processing system being different from the CTN ID parameter value of the attached processing system.

14. The computer system of claim 10, wherein the method further comprises:

comparing a system identification parameter value of the processing system and a system identification parameter value of the attached processing system; and refusing to accept the another request transmitted by the attached processing system to establish the server time protocol logical path, responsive to the system identification parameter value of the processing system is being identical to the system identification parameter value of the attached processing system.

15. The computer system of claim 10, wherein the method further comprises:

comparing a version number parameter value of a time protocol facility of the processing system and a version number parameter value of a time protocol facility of the attached processing system; and refusing to accept the another request transmitted by the attached processing system to establish the server time protocol logical path, responsive to the comparing indicating that the processing system's time protocol facility is not compatible with the attached processing system's time protocol facility.

16. The computer system of claim 10, wherein the method further comprises:

comparing a configuration block of a time protocol facility of the processing system and a configuration block of a time protocol facility of the attached processing system; and refusing to accept the another request transmitted by the attached processing system to establish the server time protocol logical path, responsive to the comparing indicates that the processing system's time protocol facility is not compatible with the attached processing system's time protocol facility.

17. A method for establishing a Server Time Protocol (STP) logical path between two processing systems in a coordinated timing network of a processing environment, the method comprising:

transmitting, by a processing system to an attached processing system, a request to establish a server time protocol logical path between the processing system and the attached processing system, the server time protocol logical path facilitating time synchronization of the processing system and the attached processing system;

receiving, by the processing system, a response from the attached processing system indicating whether the attached processing system accepted the request transmitted by the processing system;

receiving, by the processing system, another request transmitted by the attached processing system, the another request requesting to establish the server time protocol logical path between the processing system and the attached processing system;

transmitting, by the processing system to the attached processing system, another response indicating whether the processing system accepted the another request transmitted by the attached processing; and establishing the server time protocol logical path between the processing system and the attached processing system responsive to the response indicating that the request was accepted by the attached processing system and the another response indicating that the another request was accepted by the processing system.

18. The method of claim 17, further comprising:

detecting whether a data communication link has been reconfigured since the server time protocol logical path was established on the data communication link; and re-initiating the transmitting, by the processing system to the attached processing system, of the request to establish the server time protocol logical path, responsive to the data communication link having been reconfigured.

19. The method of claim 17, further comprising:

determining whether the attached processing system has failed to respond to a command to exchange time parameters with the processing system within a pre-determined period of time; and initiating the transmitting, by the processing system to the attached processing system, of the request to establish the server time protocol logical path, responsive to the attached processing system having failed to respond to the command to exchange time parameters.

20. The method of claim 17, further comprising:

comparing a coordinated timing network (CTN) identification (ID) parameter value of the processing system and a CTN ID parameter value of the attached processing system; and refusing to accept the another request transmitted by the attached processing system to establish the server time protocol logical path, responsive to the CTN ID parameter value of the processing system being different from the CTN ID parameter value of the attached processing system.

* * * * *